United States Patent
Landström et al.

(10) Patent No.: US 12,207,101 B2
(45) Date of Patent: Jan. 21, 2025

(54) RADIO NETWORK NODE AND METHODS THEREIN FOR TRANSMITTING A TRANSMISSION CONFIGURATION INDICATION (TCI) UPDATE TO A WIRELESS DEVICE

(71) Applicant: Telefonaktiebolaget LM Ericsson (publ), Stockholm (SE)

(72) Inventors: Anders Landström, Boden (SE); Magnus Thurfjell, Luleå (SE); Arne Simonsson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 429 days.

(21) Appl. No.: 17/627,303

(22) PCT Filed: Jul. 15, 2019

(86) PCT No.: PCT/EP2019/069015
§ 371 (c)(1),
(2) Date: Jan. 14, 2022

(87) PCT Pub. No.: WO2021/008682
PCT Pub. Date: Jan. 21, 2021

(65) Prior Publication Data
US 2022/0264320 A1    Aug. 18, 2022

(51) Int. Cl.
*H04W 16/28* (2009.01)
*H04B 7/01* (2006.01)
*H04B 7/06* (2006.01)
*H04L 5/00* (2006.01)

(52) U.S. Cl.
CPC ............. *H04W 16/28* (2013.01); *H04B 7/01* (2013.01); *H04B 7/0617* (2013.01);
(Continued)

(58) Field of Classification Search
CPC ....... H04W 16/28; H04B 7/01; H04B 7/0617; H04B 7/0695; H04L 5/0051; H04L 5/0048; H04L 5/0023
See application file for complete search history.

(56) References Cited

U.S. PATENT DOCUMENTS

2018/0026683 A1* 1/2018 Manholm ............ H04B 7/0695
                                                    375/267
2018/0076520 A1* 3/2018 Ma ........................ H01Q 3/36
(Continued)

FOREIGN PATENT DOCUMENTS

CN      108632008 A      10/2018
EP       3565349 A1      11/2019
WO     2019097478 A1      5/2019

OTHER PUBLICATIONS

International Search Report and Written Opinion dated Mar. 16, 2020 for International Application No. PCT/EP2019/069015 filed Jul. 15, 2019, consisting of 10—pages.
(Continued)

*Primary Examiner* — Kwang B Yao
*Assistant Examiner* — Bradley D Lytle, Jr.
(74) *Attorney, Agent, or Firm* — Weisberg I.P. Law, P.A.

(57) ABSTRACT

A network node and a method for transmitting a Transmission Configuration Indication, TCI, update to a UE. The network node associates a first transmit beam with a first reference signal having first Quasi Co-Location, QCL, channel properties. The first transmit beam gives the same first QCL channel properties and is used in data transmission to the UE. Further, the network node determines second QCL channel properties given by a second transmit beam when a beam change is triggered. When the second QCL channel properties is within a QCL channel property range of a second reference signal and when the second reference signal has third QCL channel properties being different from
(Continued)

Method performed by radio network node 110 the first QCL channel properties, the network node associates the second transmit beam with the second reference signal, and transmits, to the UE, a TCI update having an indication of the second reference signal.

20 Claims, 8 Drawing Sheets

(52) U.S. Cl.
CPC ......... *H04B 7/0695* (2013.01); *H04L 5/0048* (2013.01); *H04L 5/0051* (2013.01); *H04L 5/0023* (2013.01)

(56) References Cited

U.S. PATENT DOCUMENTS

| 2018/0206132 | A1* | 7/2018 | Guo | H04W 72/0473 |
| 2019/0089499 | A1* | 3/2019 | Nam | H04W 4/06 |
| 2019/0115955 | A1* | 4/2019 | John Wilson | H04L 5/0055 |
| 2019/0141692 | A1* | 5/2019 | Subramanian | H04B 7/088 |
| 2019/0313440 | A1* | 10/2019 | John Wilson | H04B 7/0695 |
| 2020/0014515 | A1 | 1/2020 | Qin et al. | |

OTHER PUBLICATIONS

3GPP TR 25.996 V15.0.0; 3rd Generation Partnership Project; Technical Specification Group Radio Access Network; Spatial channel model for Multiple Input Multiple Output (MIMO) simulations (Release 15); Jun. 2018, consisting of 40—pages.

3GPP TR 38.802 V14.2.0; 3rd Generation Partnership Project; Technical Specification Group Radio Access Network; Study on New Radio Access Technology Physical Layer Aspects (Release 14); Sep. 2017, consisting of 2—pages.

EPO Communication dated May 2, 2023 for Patent Application No. 19742332.0, consisting of 5—pages.

* cited by examiner

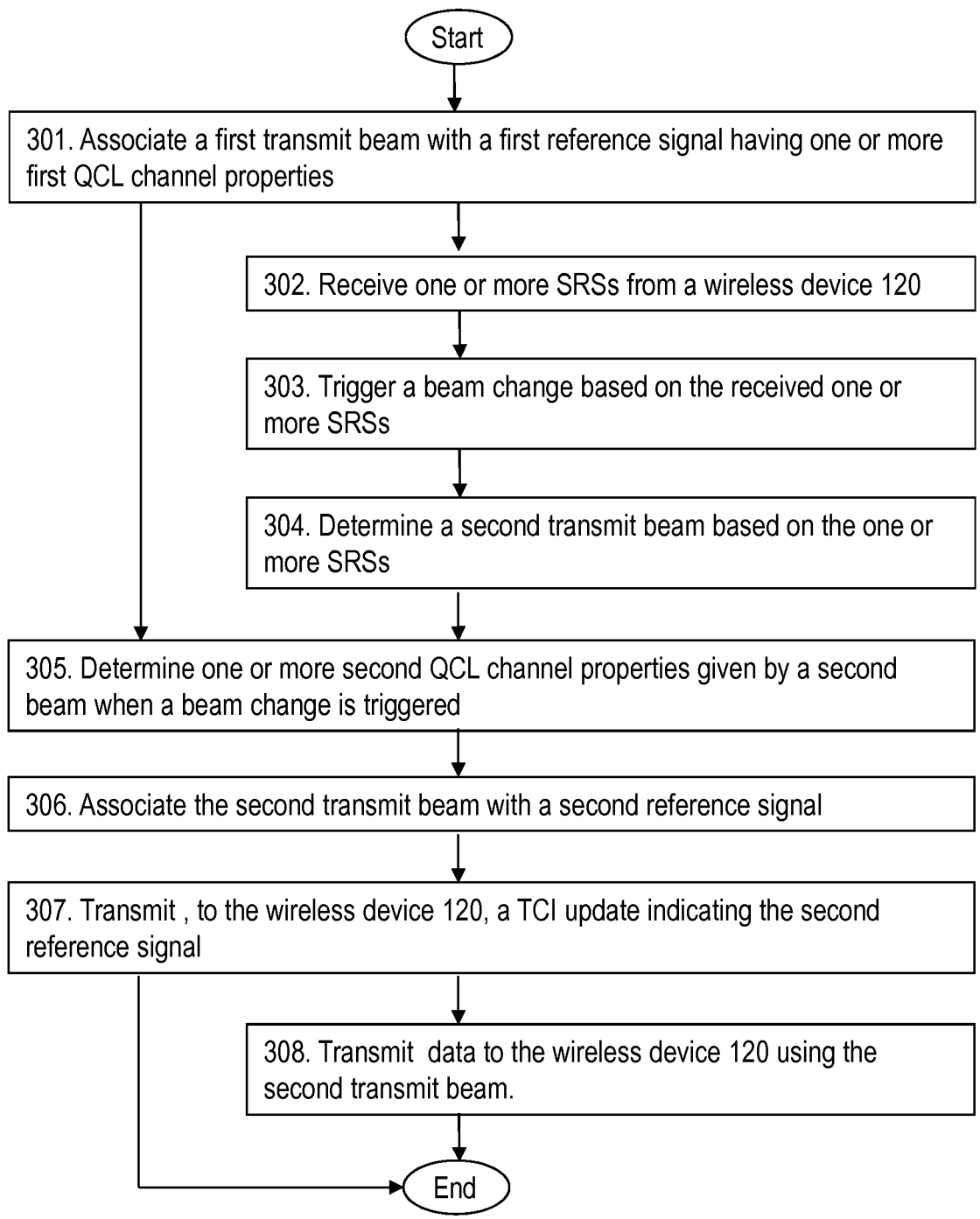
Fig. 3A Method performed by radio network node 110

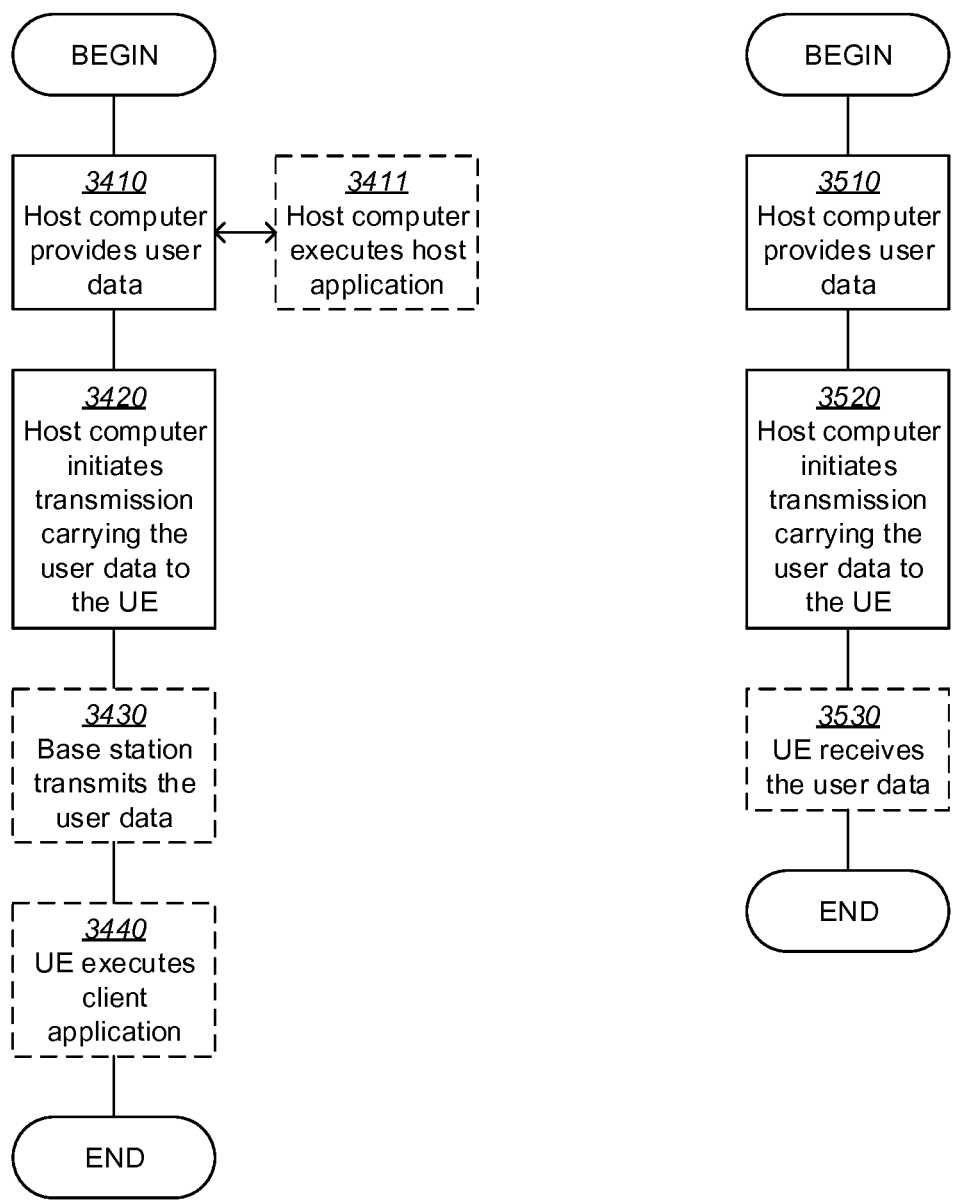

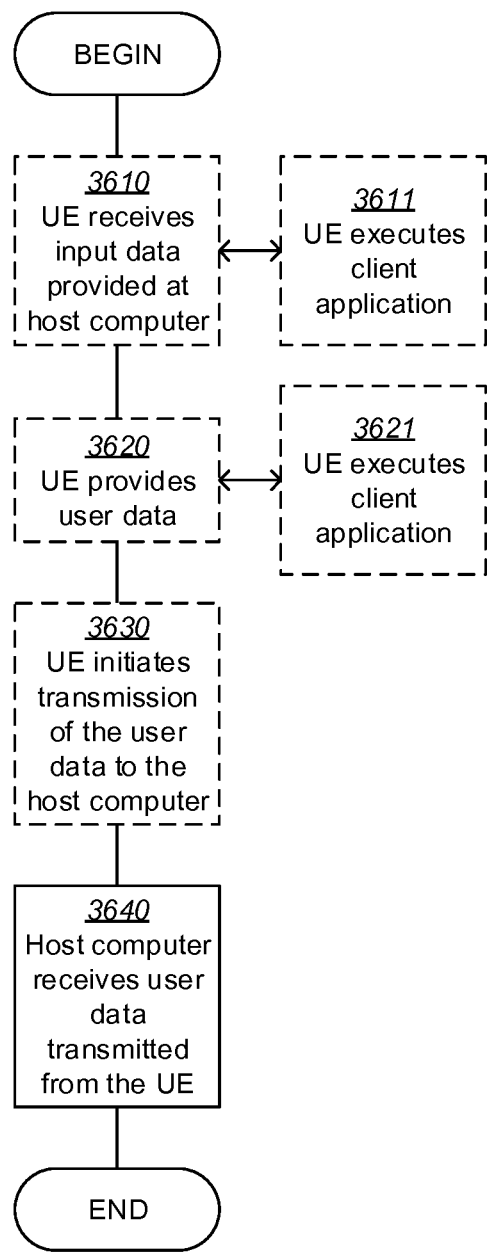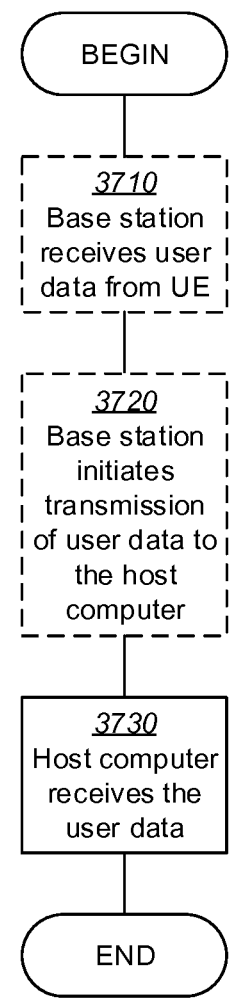
Fig. 9
Fig. 10

RADIO NETWORK NODE AND METHODS THEREIN FOR TRANSMITTING A TRANSMISSION CONFIGURATION INDICATION (TCI) UPDATE TO A WIRELESS DEVICE

CROSS-REFERENCE TO RELATED APPLICATION

This application is a Submission Under 35 U.S.C. § 371 for U.S. National Stage Patent Application of International Application Number: PCT/EP2019/069015, filed Jul. 15, 2019 entitled "A RADIO NETWORK NODE AND METHODS THEREIN FOR TRANSMITTING A TRANSMISSION CONFIGURATION INDICATION (TCI) UPDATE TO A WIRELESS DEVICE," the entirety of which is incorporated herein by reference.

TECHNICAL FIELD

Embodiments herein relate to a radio network node and to methods therein. Especially, embodiments relate to transmission of a Transmission Configuration Indication (TCI) update to a wireless device.

BACKGROUND

In a typical wireless communication network, wireless devices, also known as wireless communication devices, mobile stations, stations (STAs) and/or User Equipments (UEs), communicate via a Local Area Network (LAN) such as a WiFi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is an area, e.g. a geographical area, where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Quasi Co-Location (QCL) and Transmission Configuration Index (TCI)

The term "Quasi Co-Location (QCL)" of two antenna ports is defined by the third generation partnership project (3GPP) in the 3GPP standard document TR 38.802 V14.2.0, Sect. 6.1.6.5 as follows:

Two antenna ports are said to be quasi co-located if the large-scale properties of the channel over which a symbol on one antenna port is conveyed can be inferred from the channel over which a symbol on the other antenna port is conveyed.

Thus, a first antenna port and a second antenna port are said to be quasi co-located if the large-scale properties of the channel over which a symbol on the first antenna port is conveyed can be inferred from the channel over which a symbol on the second antenna port is conveyed.

By the expression "large-scale properties of the channel" when used in this disclosure refers to one or more properties out of delay spread, Doppler spread, Doppler shift, average gain, average delay, and spatial receive (Rx) parameters. In this disclosure, the large-scale properties of the channel are sometimes in this disclosure referred to as QCL channel properties, and it should be understood that the terms may be used interchangeably. Further, it should be understood that there are different QCL types depending on which properties that are considered. Examples of some different QCL types are QCL-Type A comprising the properties Doppler shift, Doppler spread, average delay, and delay spread; QCL-Type B comprising the properties Doppler shift, and Doppler spread; QCL-Type C comprising the properties: average delay, and Doppler shift; and QCL-Type D comprising the property Spatial Rx parameter. In practice, indicating to a UE that a first signal, such as a Downlink (DL) Reference Signal (RS), is the QCL source for a second signal means that the UE may assume that it can use settings, such as UE beam or delay settings, previously used for the first signal, e.g. the source DL RS, when receiving the second signal.

Which signals that are QCL with other signals are indicated to the UE through Transmission Configuration Indicator (TCI) states. As mentioned above, antenna ports are QCL to each other according to a QCL-Type if they are similar with respect to the channel properties in that QCL-type. An antenna port is defined by its reference signal. Signals may be said to be QCL, when the antenna port on which one signal is transmitted and the antenna port on which the other signal is transmitted are QCL. Thus, QCL between the antenna port on which data is transmitted and the antenna port on which a reference signal is transmitted may be determined. A TCI state contains one or two source DL reference signals. When two QCL source DL reference signals are combined in a TCI state, their QCL types should not be the same in order to be able to distinguish between the two QCL source DL reference signals. For example, one reference signal may have a QCL-Type B and another may have a QCL-Type D. Thus the UE may be given two reference signals to consider QCL of different types. Which one of them the UE uses depends on what property the UE is interested in and that may differ depending on purpose. Since the TCI from the gNB includes the QCL-Types, which define different sets of properties as described above, all information is available. For example, if the UE gets a TCI with two reference signals of QCL-type B and QCL-type C, respectively, and wants to estimate the average delay it uses the settings applicable for the reference signal of QCL-Type C and listens to that reference signal.

FIG. 1 schematically illustrates an exemplifying QCL indication by TCI state assignment. As illustrated in the top portion of FIG. 1, a number of Reference Signals RSs RS0, RS1, RS2, RS3 and RS4 are transmitted to the UE. The UE has been configured with a list of TCI states. The list of TCI states may be a Radio Resource Control (RRC) configured list of TCI states as shown in FIG. 1. The first RS in each TCI state will give the UE a hint of which average time delay and Doppler frequency shift the UE can expect, while the second RS indicates one or more spatial receive (Rx) parameters, i.e. the UE may use the same Rx beam as used for this second RS. In the shown example, the first RS in each TCI state is RS0, and the second RS is RS2, RS4, RS3, and RS1, respectively. Thus, RS0 will indicate to the UE which average time delay and Doppler frequency shift it can expect and the second RS will indicate which beam to use for reception. The UE maintains a list of suitable Rx beam for each RS and can switch to this beam when a TCI state referring to this beam is indicated. In the example shown in FIG. 1, an indicated TCI state TCI2 gives RS4 as the second RS and that the Rx beam 3 should be used for reception.

In prior art there is a fixed limited set of transmit beams that may each be predefined as being QCL to a specific reference signal.

Reciprocity Based Beamforming

Reciprocity based beamforming utilizes the reciprocal channel properties between uplink and downlink. This means that the beamforming weights for transmission e.g. in the downlink, is calculated from a received signal in the uplink, e.g. from the uplink received phase and amplitude differences between the antenna elements making up an antenna array. For Time Division Duplex (TDD) this holds especially true for even more detailed aspects of the channel but for beamforming purposes it holds also for Frequency Division Duplex (FDD). The reason for this is that for TDD the same frequency band is used in the uplink as in the downlink so even the short term, small scale properties will be the same, e.g. frequency selective fast fading. For FDD where different frequency bands are used for the uplink and the downlink still large scale properties such as delay spread, Doppler shift etc., are similar in the uplink and in the downlink.

The transmit beam is in these cases not limited to one out of a predefined set of beams but may have any direction or shape resulting in an infinite number of possible beams.

SUMMARY

As a part of developing embodiments herein a problem will first be identified and discussed.

As mentioned above, in some scenarios a transmit beam may have any direction or shape resulting in an infinite number of possible transmit beams.

For example, for reciprocity-based beamforming there are no fixed beam relations that may be used to configure different QCL or QCL types. This is also true for any free beamforming, e.g. in all cases when not a fixed Grid-of-Beams (GoB) are used.

The free formed beams may have any shape or direction and an unlimited number of alternative beams exist. Therefore, pre-calculation of QCL relations cannot be done for all possible beam alternatives.

When a reciprocity-based beamforming is used, a beam change, such as a switch, may result in that time and/or frequency properties of the channel are changed so much that the beam connection is lost and the UE needs to perform a new random access procedure in order to re-establish the connection, which may result in a break in service and in an increased delay. In worst case the connection is dropped, i.e. it is not possible to maintain the connection any longer.

An object of embodiments disclosed herein is therefore to overcome or at least ameliorate the drawbacks with the prior art.

According to an aspect of embodiments herein, the object is achieved by a method performed by a radio network node for transmitting a Transmission Configuration Indication (TCI) update to a wireless device. The radio network node and the wireless device are operating in a wireless communications network.

The radio network node associates a first transmit beam with a first reference signal having one or more first Quasi Co-Location (QCL) channel properties, wherein the first transmit beam gives the same one or more first QCL channel properties and is used in data transmission to the wireless device.

Further, the radio network node determines one or more second QCL channel properties given by a second transmit beam when a beam change is triggered.

When the one or more second QCL channel properties is within a QCL channel property range of a second reference signal and when the second reference signal has one or more third QCL channel properties being different from the one or more first QCL channel properties, the radio network node associates the second transmit beam with the second reference signal, and transmits, to the wireless device, a TCI update comprising an indication of the second reference signal.

According to another aspect of embodiments herein, the object is achieved by a radio network node for transmitting a Transmission Configuration Indication (TCI) update to a wireless device. The radio network node and the wireless device are configured to operate in a wireless communications network.

The radio network node is configured to associate a first transmit beam with a first reference signal having one or more first Quasi Co-Location (QCL) channel properties, wherein the first transmit beam gives the same one or more first QCL channel properties and is used in data transmission to the wireless device.

Further, the radio network node is configured to determine one or more second QCL channel properties given by a second transmit beam when a beam change is triggered.

Furthermore, the radio network node is configured to associate the second transmit beam with a second reference signal, and to transmit, to the wireless device, a TCI update comprising an indication of the second reference signal, when the one or more second QCL channel properties is within a QCL channel property range of the second reference signal and when the second reference signal has one or more third QCL channel properties being different from the one or more first QCL channel properties.

According to another aspect of embodiments herein, the object is achieved computer program comprises instructions, which when executed by at least one processor of the wireless device, cause the at least one processor of the radio network node to perform one or more of the actions described herein.

According to another aspect of embodiments herein, the object is achieved by a carrier comprising the respective computer program, wherein the carrier is one of an electronic signal, an optical signal, an electromagnetic signal, a magnetic signal, an electric signal, a radio signal, a microwave signal, or a computer-readable storage medium.

Since the radio network node is configured to associate the second transmit beam with the second reference signal, and to transmit the TCI update comprising the indication of the second reference signal to the wireless device, when the one or more second QCL channel properties is within the QCL channel property range of the second reference signal and when the second reference signal has one or more third QCL channel properties being different from the one or more first QCL channel properties, the wireless device will receive TCI updates when the transmission environment changes whereby the wireless device will know which updated settings it should use for reception of signals transmitted from the radio network node. This results in an improved performance of the wireless communications network.

An advantage of some embodiments disclosed herein is that the wireless device may be updated on QCL properties for reciprocity-based beams or other non-Grid of Beam (non-GoB) beamforming solutions.

Another advantage of some embodiments disclosed herein is that a reduction of dropped calls is provided.

Yet another advantage of some embodiments disclosed herein is that a reduction of random access for re-establishment of connections is provided due to the reduced number of dropped calls.

Some embodiments disclosed herein also provide a reduced delay at beam switch by improving the possibility to support Ultra-Reliable Low latency Connection (URLLC).

BRIEF DESCRIPTION OF THE DRAWINGS

Examples of embodiments herein are described in more detail with reference to attached drawings in which:

FIG. 3A is a flowchart depicting embodiments of methods in a radio network node;

FIGS. 7-10 are flowcharts illustrating methods implemented in a communication system including a host computer, a base station and a user equipment.

DETAILED DESCRIPTION

Embodiments herein may refer to Channel State Information (CSI), dynamic Time Division Duplex (TDD).

Some embodiments disclosed herein relate to a method for deciding a QSL relationship between a reference signal and a transmit beam, e.g. an arbitrary shaped or arbitrary directed beam, used by a radio network, e.g. a gNB, node for transmission to a wireless device, e.g. a UE.

A TCI update is sent from the radio network node to the wireless device based on a beam direction of an arbitrary transmit beam relative to beam directions or ranges used by Reference Signals (RSs) used in one or more configured TCI states. The beam direction of the arbitrary transmit beam may be calculated or defined based on one or more radio parameters such as e.g.: highest beam gain, Half Power Beam Width (HPBW) centre, weighted beam gain centre, and beam RMS angular spread $\mu_o$.

The beam direction is a two dimensional parameter given by an azimuth and an elevation.

In some embodiments herein, a transmit beam is associated with a first reference signal having a first Synchronization Signal Beam (SSB), and one or more QCL properties of the first reference signal. The association may be based on beam directions, such as beam bore sight or beam angle range. By the expression "beam bore sight" when used in this disclosure is meant an axis of maximum gain, e.g. maximum radiated power, of the beam, and by the expression "beam angle range" is meant an angular distribution of the beam.

When a beam is changed so that the direction shall be associated with another reference signal, e.g. a second reference signal having a second SSB, a TCI update is sent from the radio network node to the wireless device to enable smooth synchronization and to maintain connectivity between the radio network node and the wireless device.

Figure 1:
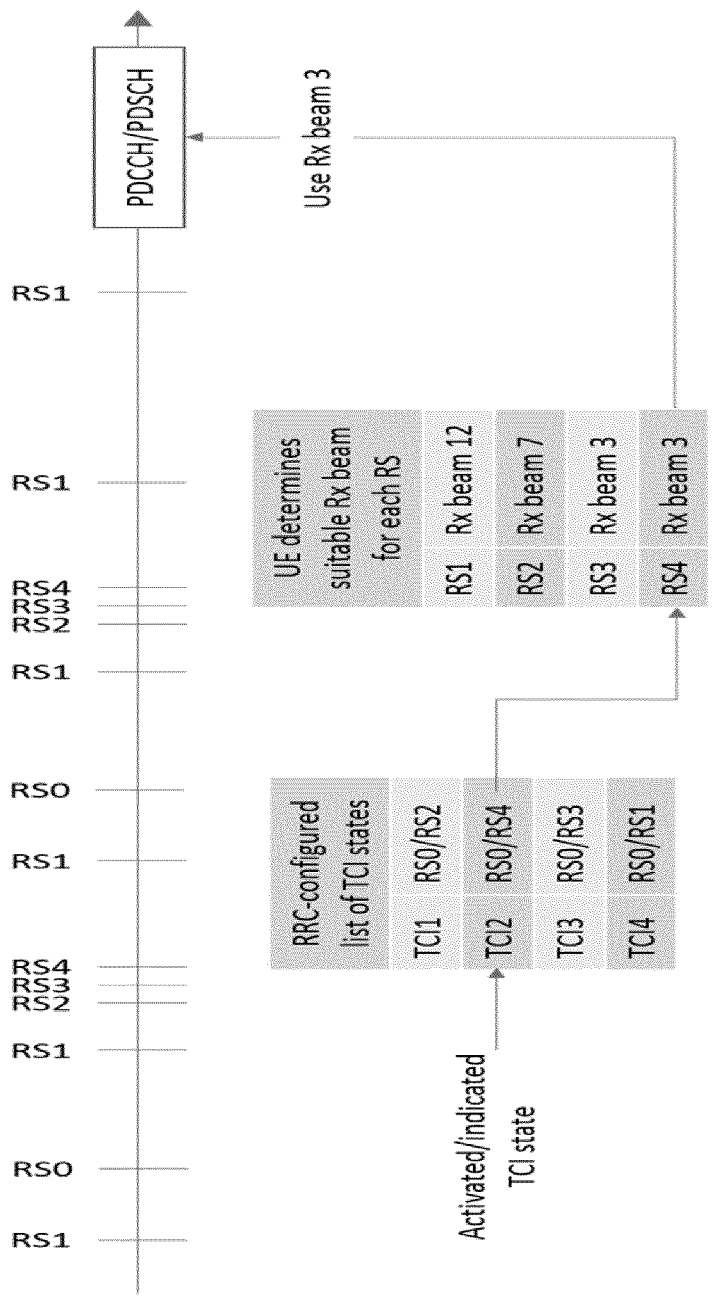
FIG. 1 is a combined signaling scheme and flowchart illustrating an example of QCL indication by TCI state assignment according to prior art.
Figure 2:
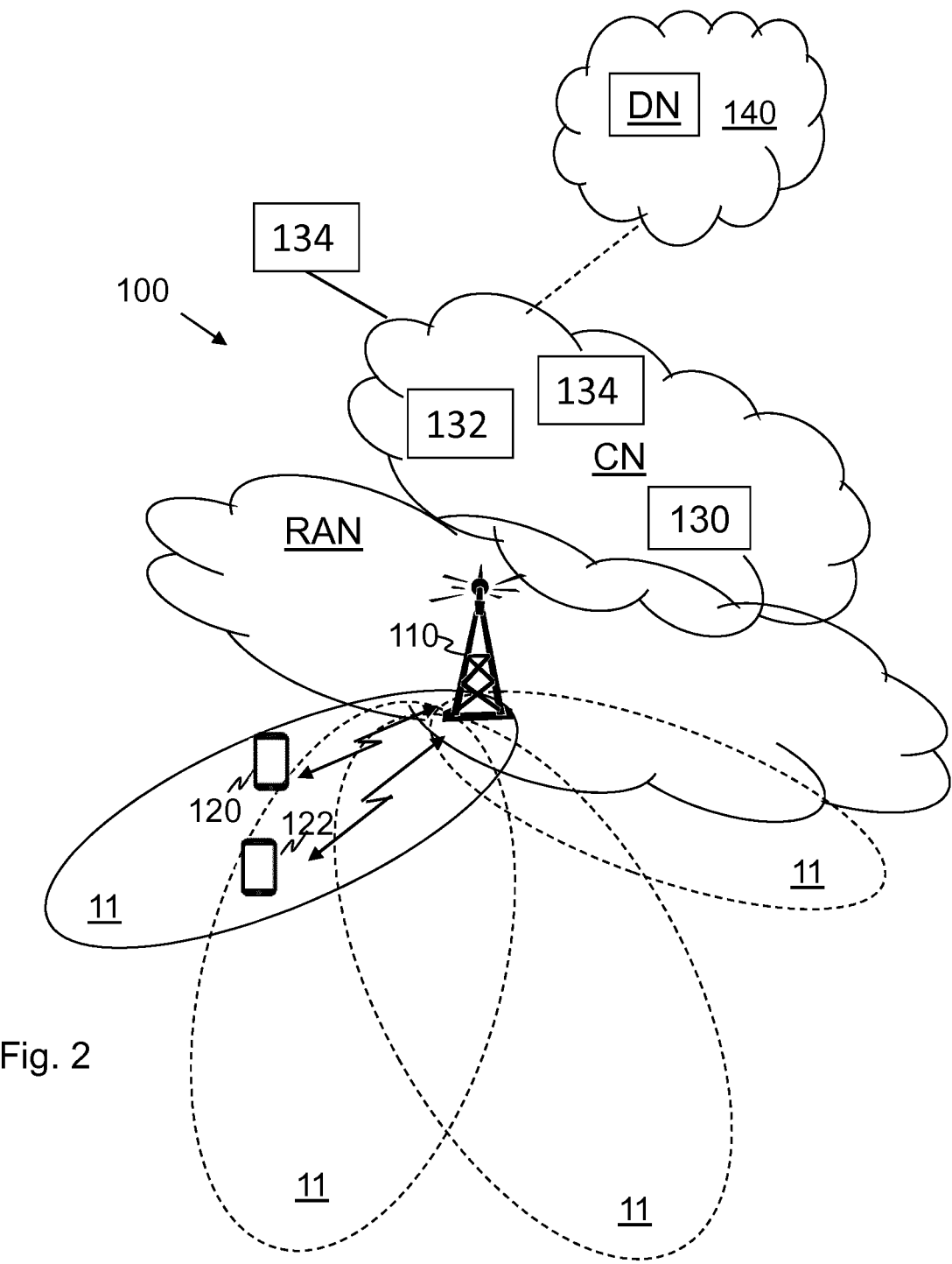
FIG. 2 is a schematic block diagram illustrating embodiments of a wireless communications network.

Embodiments herein relate to wireless communication networks in general. FIG. 2 is a schematic overview depicting a wireless communications network 100 wherein embodiments herein may be implemented. The wireless communications network 100 may be referred to as a radio communications network. The wireless communications network 100 comprises one or more Radio Access Networks (RANs) and one or more Core Networks (CNs). The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Sometimes in this disclosure the wireless communications network 100 is referred to as just a network.

Wireless devices e.g. a wireless device 120 also sometimes referred to as the first UE 120, is operating in the wireless communications network 100. One or more further wireless devices 122 also sometimes referred to as one or more second UEs 122 may operate in the wireless communications network 100. As schematically illustrated in FIG. 2, the wireless device 120,122 may communicate with a network node, e.g. a network node 110 which will be described below.

The wireless devices 120, 122 may each e.g. be a mobile station, a non-Access Point (non-AP) STA, a STA, a user equipment and/or a wireless terminals, an NB-IoT device, an enhanced Machine Type Communication (eMTC) device and a category M (CAT-M) device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

Network nodes operate in the radio communications network 100, such as a Radio Network Node (RNN) 110 also sometimes referred to as the first network node 110. The network node 110 provides radio coverage over one or more geographical areas, e.g. one or more service areas 11, which may also be referred to as cells, beams or beam groups of a first Radio Access Technology (RAT), such as 5G, LTE, Wi-Fi, NB-IoT, CAT-M, Wi-Fi, eMTC or similar. The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110, i.e. by the radio network node 110, depending e.g. on the radio access technology and terminology used. The network node 110, i.e. the radio network node 110, may be referred to as a serving radio network node and communicates with the wireless device 120, 122 with Downlink (DL) transmissions to the wireless device 120, 122 and Uplink (UL) transmissions from the wireless device 120, 122.

Further network nodes operate in the radio communications network 100, such as a Mobility Network Node (MNN) 130 also sometimes referred to as the second network node 130. The network node 130 may be an MME which is a control node for an LTE access network, a Serving Gateway (SGW), and a Packet Data Network Gateway (PGW). An MME is amongst other responsible for tracking and paging procedure including retransmissions. Further, the network node 130 may be an Operation And Maintenance (OAM) node such as an Operation and Support System Radio and Core (OSS-RC) node or an Ericsson Network Management (ENM) node.

Further network nodes such as a location server 132 and a positioning server 134 operate in the radio communications network 100. For example, the location server 30,132 may be an E-SMLC and the positioning server 134 may be an RTK server. The location server 132 and the positioning server 134 may communication with each other over a communications interface.

It should be understood that the positioning server 134 may be arranged external of the radio communications network 100 and in such a scenario the positioning server 134 may be referred to as an external positioning server 132 and the location server 132 and the positioning server 134 may communicate over an IP interface.

The positioning server 134 may sometimes herein be referred to as an RTK server or an RTK network provider.

Methods according to embodiments herein may be performed by any of the network node 110, such as e.g. an eNB, the wireless device 120, e.g. the UE, the mobility network node 130, the location server 132 and/or by the positioning server 134. As an alternative, a Distributed Node (DN) and functionality, e.g. comprised in a cloud 140 as shown in FIG. 2 may be used for performing or partly performing the methods.

Example embodiments of a flowchart depicting embodiments of a method performed by the radio network node 110, e.g. the gNB, for transmitting a TCI update to the wireless device 120 is depicted in FIG. 3A and will be described more in detail in the following. As previously mentioned, the radio network node 110 and the first wireless device 120 operate in the wireless communications network 100. The method may comprise one or more of the following actions which actions may be taken in any suitable order. Further, it should be understood that one or more actions may be optional and that actions may be combined.

Action 301

The radio network node 110 associates a first transmit beam with a first reference signal having one or more first Quasi Co-Location, QCL, channel properties. The first transmit beam gives the same one or more first QCL channel properties as the first reference signal. Further, the first transmit beam is used in data transmission, e.g. in on-going data transmission, to the wireless device 120.

Thus, the first transmit beam, which is used by the radio network node 110 in transmission of data to the wireless device 120, is associated with the first reference signal.

The transmit beam may be used for transmission on a Physical Downlink Shared CHannel (PDSCH) and/or a Physical Downlink Control CHannel (PDCCH).

The first reference signal may be a reference signal having a first SSB. This means that the reference signal is transmitted using the first SSB.

The one or more QCL channel properties may comprise one or more out of: a delay spread, a Doppler spread, a Doppler shift, an average gain, an average delay, and a spatial receive parameter.

The expression that "the first transmit beam gives the same one or more first QCL channel properties as the first reference signal" means that a transmission using the first transmit beam is transmitted over a radio channel having the one or more first QCL channel properties, and that a similar radio channel is used for transmission of the first reference signal.

Action 302

In some embodiments, e.g. in some embodiments relating to reciprocity based beamforming, the radio network node 110 receives, from the wireless device 120, one or more Sounding Reference Signals (SRSs). The one or more SRSs are used to determine the reception quality of transmissions in the uplink. In reciprocity based beamforming the transmission quality in the downlink is assumed to be the same as the reception quality in the uplink and therefore the one or more SRSs transmitted by the wireless device 120 in the uplink is used by the radio network node 110 to determine the transmission quality in the downlink and whether or not a beam change, e.g. a change of transmit beam, should be triggered.

Action 303

In some embodiments, e.g. in some embodiments relating to reciprocity based beamforming, the radio network node 110 triggers a beam change based on the received one or more SRSs.

As mentioned above, the SRSs transmitted in the uplink may be used to determine the transmission quality in the downlink. Thus, when radio network node 110, based on the received one or more SRSs, determines that the reception quality in the uplink is below a threshold value, the radio network node 110 will, in the case of reciprocity based beamforming, determine that the transmission quality in the downlink also is below a threshold value. In such a scenario, the radio network node 110 will trigger a beam change.

Action 304

In some embodiments, e.g. in some embodiments relating to reciprocity based beamforming, the radio network node 110 determines the second transmit beam based on the received one or more SRSs.

For example, the radio network node 110 may determine the second transmit beam based on the received one or more SRSs by performing a reciprocity based method such as Reciprocity Assisted Transmission (RAT), Minimum Mean Square Error (MMSE), eigen beamforming, etc. The reciprocity based method is based on the reception of SRS on the antenna array used for transmission, and the channel is measured and reversed e.g. by using the conjugate of the complex channel estimations on each antenna elements when weighting the signal for transmission.

Action 305

The radio network node 110 determines one or more second QCL channel properties given by a second transmit beam when a beam change is triggered.

As mentioned above, the QCL channel properties may comprise one or more out of: a delay spread, a Doppler spread, a Doppler shift, an average gain, an average delay, and a spatial receive parameter.

Thus, when a beam change is triggered, the radio network node 110 determines one or more second QCL channel properties given by the second transmit beam. This means that a transmission using the second transmit beam will be transmitted over a radio channel having the one or more second QCL channel properties.

It should be understood that the second transmit beam may be the same as the first transmit beam. For example, this may be the case when the beam change has been triggered based on one or more received SRSs as will be described below, but it is determined that the radio channel, e.g. the QCL channel properties, has not changed.

Further, the radio network node 110 may determine whether or not the one or more second QCL channel properties is within a QCL channel property range of a second reference signal.

The second reference signal may be a reference signal having a second SSB. This means that the reference signal is transmitted using the second SSB.

The second reference signal is different from the first reference signal.

By the expression that "the one or more second QCL channel properties given by the second transmit beam is within a QCL channel property range of the second reference signal" is meant that one or more out of the delay spread, the Doppler spread, the Doppler shift, the average gain, the average delay, and the spatial receive parameter given for a transmission using the transmit beam is within a respective range or interval of the delay spread, the Doppler spread, the Doppler shift, the average gain, the average delay, and the spatial receive parameter for the second reference signal.

Furthermore, the radio network node 110 may determine whether or not the second reference signal has one or more third QCL channel properties being different from the one or more first QCL channel properties.

As previously mentioned, the QCL channel properties may comprise one or more out of: a delay spread, a Doppler spread, a Doppler shift, an average gain, an average delay, and a spatial receive parameter.

Thus, the radio network node 110 may determine whether or not one or more out of the delay spread, the Doppler spread, the Doppler shift, the average gain, the average delay, and the spatial receive parameter of the second reference signal is different from one or more out of the delay spread, the Doppler spread, the Doppler shift, the average gain, the average delay, and the spatial receive parameter of the first reference signal.

As will be described in Action 306 below, when the one or more second QCL channel properties is within the QCL channel property range of the second reference signal and when the second reference signal has one or more third QCL channel properties being different from the one or more first QCL channel properties, the radio conditions have changed and the second transmit beam should be associated with the second reference signal.

The radio network node 110 may determine the one or more second QCL channel properties in several ways, some of which will be described below.

For example, the radio network node 110 may determine the one or more second QCL channel properties based on a finding of a direction of a highest beam power gain. A set of complex weights on the individual antenna elements defines the shape of the beam. By a straight forward mathematical calculation based on Fast Fourier transform (FFT) on these weights the shape of the beam appears and the highest beam power gain direction may be identified. For example, the average gain and/or the spatial receive parameter may be determined based on the direction of the highest beam power gain.

Alternatively or additionally, the radio network node 110 may determine the one or more second QCL channel properties based on a finding of a mid-point between Half Power Beam Width (HPBW) limits. For example, the average gain and/or the spatial receive parameter may be determined based on the mid-point between HPBW limits.

Alternatively or additionally, the radio network node 110 may determine the one or more second QCL channel properties based on a finding of a median beam power gain pointing direction. For example, the average gain and/or the spatial receive parameter may be determined based on the median beam power gain pointing direction.

Alternatively or additionally, the radio network node 110 may determine the one or more second QCL channel properties based on a finding of a mean beam power gain pointing direction. For example, the average gain and/or the spatial receive parameter may be determined based on the mean beam power gain pointing direction.

Alternatively or additionally, the radio network node 110 may determine the one or more second QCL channel properties based on a finding of an angle spread $\sigma_{AS}$, wherein the angle spread $\sigma_{AS}$ is given by $$\sigma_{AS} = \sqrt{\frac{\sum_{n=1}^{N}\sum_{m=1}^{M}(\theta_{n,m,\mu})^2 \cdot P_{n,m}}{\sum_{n=1}^{N}\sum_{m=1}^{M}P_{n,m}}}$$

N is a number of multipaths of a signal, M is a number of subpaths of the signal, $P_{n,m}$ is the power for the mth subpath of the nth path, and wherein $\theta_{n,m,\mu}$ is defined as $\theta_{n,m,\mu} = \mathrm{mod}(\theta_{n,m} - \mu_\theta + \pi, 2\pi) - \pi,$ $\mu_\theta$ is a reference angle given by $$\mu_\theta = \frac{\sum_{n=1}^{N}\sum_{m=1}^{M}\theta_{n,m} \cdot P_{n,m}}{\sum_{n=1}^{N}\sum_{m=1}^{M}P_{n,m}},$$

wherein $\Theta_{n,m}$ is a selected set of angles in a grid of angles with known antenna gains $P_{n,m}$. For example, the spatial receive parameter and/or the delay spread may be determined based on the angle spread $\sigma_{AS}$.

In some embodiments, the radio network node 100 excludes one or more side lobes and/or back-lobes on the second transmit beam by restricting a range of included beam gain directions. In other words, the radio network node 110 may exclude the one or more side lobes and/or back-lobes on the second transmit beam by providing a limit on the beam gain directions to be included.

Action 306

When the one or more second QCL channel properties is within the QCL channel property range of the second reference signal and when the second reference signal has one or more third QCL channel properties being different from the one or more first QCL channel properties as described in Action 305 above, the radio network node 110 associates the second transmit beam with the second reference signal.

In other words, when the one or more second QCL channel properties is within the QCL channel property range of the second reference signal and when the second reference signal has one or more third QCL channel properties being different from the one or more first QCL channel properties as described in Action 305 above, the radio network node 110 links the second transmit beam with the second reference signal. Thereby, a transmission using the second transmit beam is transmitted in the same way, e.g. with similar spatial transmit parameters, and on a similar radio channel as a transmission of the second reference signal.

The radio network node 110 may associate the second transmit beam with the second reference signal by associating the second transmit beam with the second reference signal out of a set of second reference signals, wherein the second reference signal has a strongest beam gain in a determined second beam direction out of the set of second reference signals.

Alternatively or additionally, the radio network node 110 may associate the second transmit beam with the second reference signal by associating the second transmit beam with the second reference signal out of a set of second reference signals, wherein the second reference signal has a beam direction closest to the second transmit beam out of the set of second reference signals.

Action 307

When the one or more second QCL channel properties is within the QCL channel property range of the second reference signal and when the second reference signal has one or more third QCL channel properties being different from the one or more first QCL channel properties as described in Action 305 above, the radio network node 110 transmits, to the wireless device 120, a TCI update comprising an indication of the second reference signal.

Thereby, the wireless device 120 will receive knowledge about the second reference signal. That will also indicate to the wireless device 120 how a next transmission will be transmitted from the radio network node 110 to the wireless device 120. Thus, the wireless device 120 may use the same setting as for reception of the second reference signal when receiving the next transmission from the radio network node 110.

The radio network node 110 may transmit the TCI update to the wireless device 120 using the first transmit beam or the second transmit beam. Thus, the radio network node 110 may transmit the TCI update using the old transmit beam or the new transmit beam.

Action 308

In some embodiments, the radio network node 100 may further transmit data to the wireless device 120 using the second transmit beam.

For example, the second transmit beam may be used for transmission on the PDSCH.

As previously mentioned in Action 307, the TCI update will indicate the second reference signal to the wireless device 120, and thereby the wireless device 120 will also know how a next transmission will be transmitted from the radio network node 110 to the wireless device 120. Thus, the wireless device 120 may use the same setting as for reception of the second reference signal when receiving the next transmission, e.g. data, transmitted from the radio network node 110 using the second transmit beam.

Figure 3B:
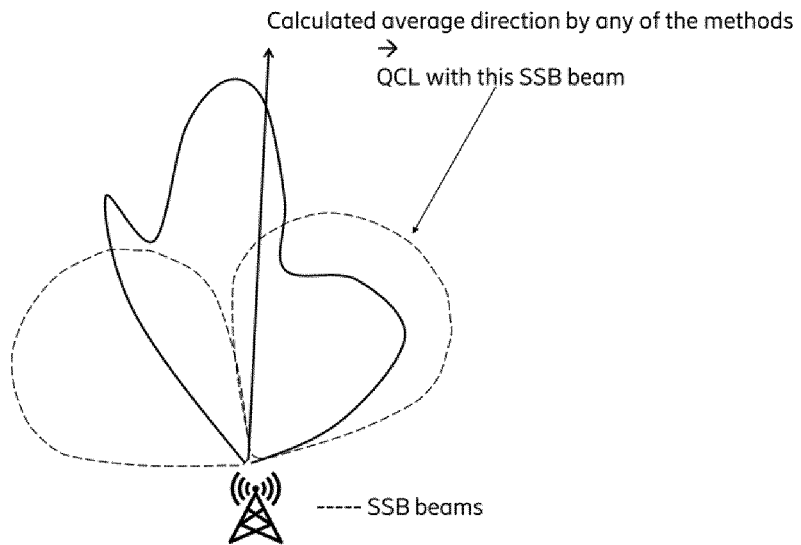
FIG. 3B schematically illustrates a QCL establishment with an arbitrary shaped beam according to some embodiments.

FIG. 3B schematically illustrates a QCL establishment with an arbitrary shaped beam according to some embodiments disclosed herein. The figure illustrates the beam shapes of the arbitrary shaped beam (solid) and of two reference signal beams (dashed). The arbitrary shaped beam may be the first transmit beam mentioned above. Further, a calculated average direction of the arbitrary shaped beam is illustrated by the solid arrow. The average direction may be calculated by anyone of the methods described herein. The two reference signal beams, e.g. SSBs, may be the respective beam for the first reference signal and the second reference signal, respectively.

Figure 4:
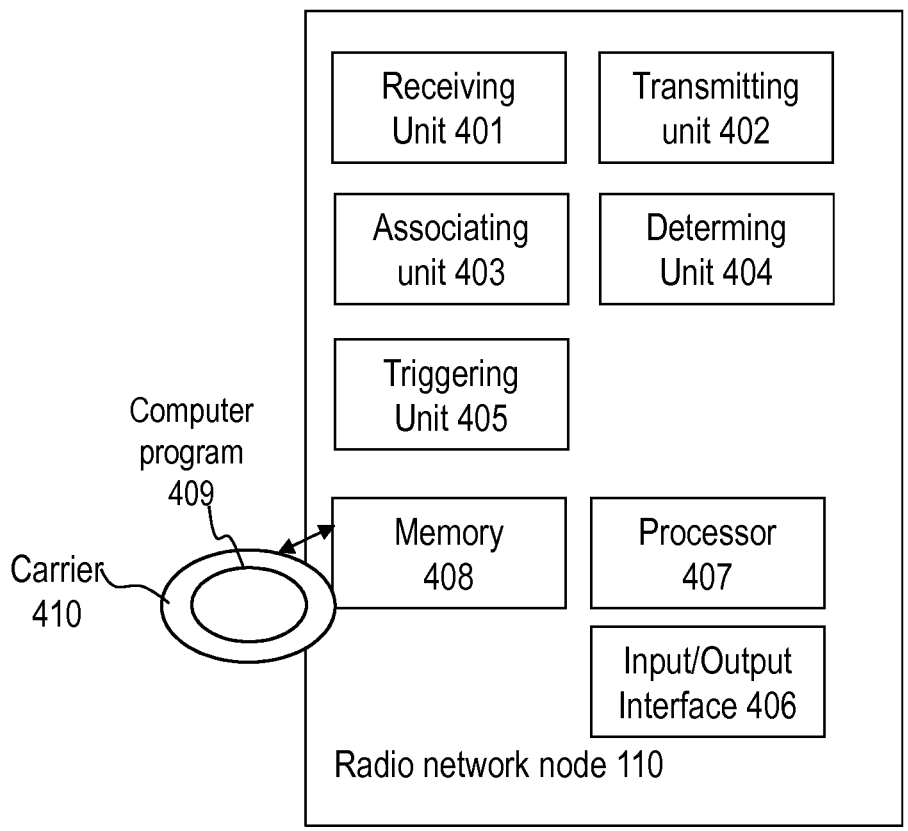
FIG. 4 is schematic block diagram illustrating embodiments of a radio network node.

To perform the method actions e.g. for transmitting a TCI update to the wireless device 120, the radio network node 110 may comprise the arrangement depicted in FIG. 4. As previously mentioned, the radio network node 110 and the first wireless device 120 are configured to operate in the wireless communications network 100.

The radio network node 110 is configured to receive, e.g. by means of a receiving unit 401, a signal, message or information from one or more nodes, e.g. from the wireless device 120, operating in the communications network 100. The receiving unit 401 may be implemented by or arranged in communication with a processor 407 of the radio network node 110. The processor 407 will be described in more detail below.

The radio network node 110 may be configured to receive one or more SRSs from the wireless device 120.

The radio network node 110 may be configured to transmit, e.g. by means of a transmitting unit 402, a signal, message or information from one or more nodes, e.g. to the wireless device 120, operating in the communications network 100. The transmitting unit 402 may be implemented by or arranged in communication with the processor 407 of the radio network node 110.

The radio network node 110 is configured to transmit, to the wireless device 120, a TCI update comprising an indication of the second reference signal. As mentioned above, the radio network node 110 is configured to transmit the TCI update when one or more second QCL channel properties of a second transmit beam is within the QCL channel property range of a second reference signal and when the second reference signal has one or more third QCL channel properties being different from one or more first QCL channel properties of a first reference signal.

The radio network node 110 may be configured to transmit the TCI update to the wireless device 120 using the first transmit beam or the second transmit beam.

In some embodiments, the radio network node 110 is configured to transmit data to the wireless device 120 using the second transmit beam.

The radio network node 110 is configured to associate, e.g. by means of an associating unit 403, a transmit beam with a reference signal. The associating unit 403 may be implemented by or arranged in communication with the processor 407 of the radio network node 110.

The radio network node 110 is configured to associate a first transmit beam with a first reference signal having one or more first QCL channel properties. The first transmit beam gives the same one or more first QCL channel properties as the first reference signal. Further, the first transmit beam is used in data transmission, e.g. in on-going data transmission, to the wireless device 120.

Furthermore, the radio network node 110 is configured to associate a second transmit beam with a second reference signal when the one or more second QCL channel properties is within the QCL channel property range of the second reference signal and when the second reference signal has one or more third QCL channel properties being different from the one or more first QCL channel properties.

The radio network node 110 may be configured to associate the second transmit beam with the second reference signal by associating the second transmit beam with the second reference signal out of a set of second reference signals, wherein the second reference signal has a strongest beam gain in a determined second beam direction out of the set of second reference signals.

Alternatively or additionally, the radio network node 110 may be configured to associate the second transmit beam with the second reference signal by associating the second transmit beam with the second reference signal out of a set of second reference signals, wherein the second reference signal has a beam direction closest to the second transmit beam out of the set of second reference signals.

The radio network node 110 is configured to determine, e.g. by means of a determining unit 404, one or more QCL channel properties. The determining unit 404 may be implemented by or arranged in communication with the processor 407 of the radio network node 110.

The radio network node 110 is configured to determine one or more second QCL channel properties given by a second transmit beam when a beam change is triggered.

Further, in some embodiments, the radio network node 110 is configured to determine the second transmit beam based on the received one or more SRSs.

As mentioned above, the QCL channel properties may comprise one or more out of: a delay spread, a Doppler spread, a Doppler shift, an average gain, an average delay, and a spatial receive parameter.

The radio network node 110 may be configured to determine the one or more second QCL channel properties in several ways, some of which will be described below.

For example, the radio network node 110 may be configured to determine the one or more second QCL channel properties based on a finding of a direction of a highest beam power gain.

Alternatively or additionally, the radio network node 110 may be configured to determine the one or more second QCL channel properties based on a finding of a mid-point between Half Power Beam Width (HPBW) limits.

Alternatively or additionally, the radio network node 110 may be configured to determine the one or more second QCL channel properties based on a finding of a median beam power gain pointing direction.

Alternatively or additionally, the radio network node 110 may be configured to determine the one or more second QCL channel properties based on a finding of a mean beam power gain pointing direction.

Alternatively or additionally, the radio network node 110 may be configured to determine the one or more second QCL channel properties based on a finding of an angle spread $\sigma_{AS}$, wherein the angle spread $\sigma_{AS}$ is given by $$\sigma_{AS} = \sqrt{\frac{\sum_{n=1}^{N}\sum_{m=1}^{M} (\theta_{n,m,\mu})^2 \cdot P_{n,m}}{\sum_{n=1}^{N}\sum_{m=1}^{M} P_{n,m}}}$$

N is a number of multipaths of a signal, M is a number of subpaths of the signal, $P_{n,m}$ is the power for the mth subpath of the nth path, and wherein $\theta_{n,m,\mu}$ is defined as $\theta_{n,m,\mu} = \mod(\theta_{n,m} - \mu_\theta + \pi, 2\pi) - \pi$, $\mu_\theta$ is a reference angle given by $$\mu_\theta = \frac{\sum_{n=1}^{N}\sum_{m=1}^{M} \theta_{n,m} \cdot P_{n,m}}{\sum_{n=1}^{N}\sum_{m=1}^{M} P_{n,m}},$$

wherein $\Theta_{n,m}$ is a selected set of angles in a grid of angles with known antenna gains $P_{n,m}$.

In some embodiments, the radio network node 100 is configured to exclude one or more side lobes and/or back-lobes on the second transmit beam by restricting a range of included beam gain directions. In other words, the radio network node 110 may be configured to exclude the one or more side lobes and/or back-lobes on the second transmit beam by providing a limit on the beam gain directions to be included.

In some embodiments, the radio network node 110 is configured to trigger, e.g. by means of the triggering unit 405, a beam change. The triggering unit 405 may be implemented by or arranged in communication with the processor 407 of the radio network node 110.

The radio network node 110 may be configured to trigger the beam change based on the one or more SRSs received from the wireless device 120.

Those skilled in the art will also appreciate that the units in the radio network node 110 described above may refer to a combination of analog and digital circuits, and/or one or more processors configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The radio network node 110 may comprise an input and output interface 406 configured to communicate with one or more out of the wireless device 120, 122, the network node 130, and the location server 132. The input and output interface may comprise a wireless receiver (not shown) and a wireless transmitter (not shown).

The embodiments herein may be implemented through a respective processor or one or more processors, such as the processor 407 of a processing circuitry in network node 110 depicted in FIG. 4, together with respective computer program code for performing functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 408 comprising one or more memory units. The memory comprises instructions executable by the processor in the network node 110.

The memory is arranged to be used to store e.g. data, configurations, and applications to perform the methods herein when being executed in the network node 110. For example, the memory may comprise the buffer having the buffer size referred to herein.

In some embodiments, a computer program 409 comprises instructions, which when executed by the at least one processor, cause the at least one processor of the radio network node 110 to perform one or more of the actions described herein.

In some embodiments, a carrier 410 comprises the computer program, wherein the carrier is one of an electronic signal, an optical signal, an electromagnetic signal, a magnetic signal, an electric signal, a radio signal, a microwave signal, or a computer-readable storage medium.

Further Extensions and Variations

Figure 5:
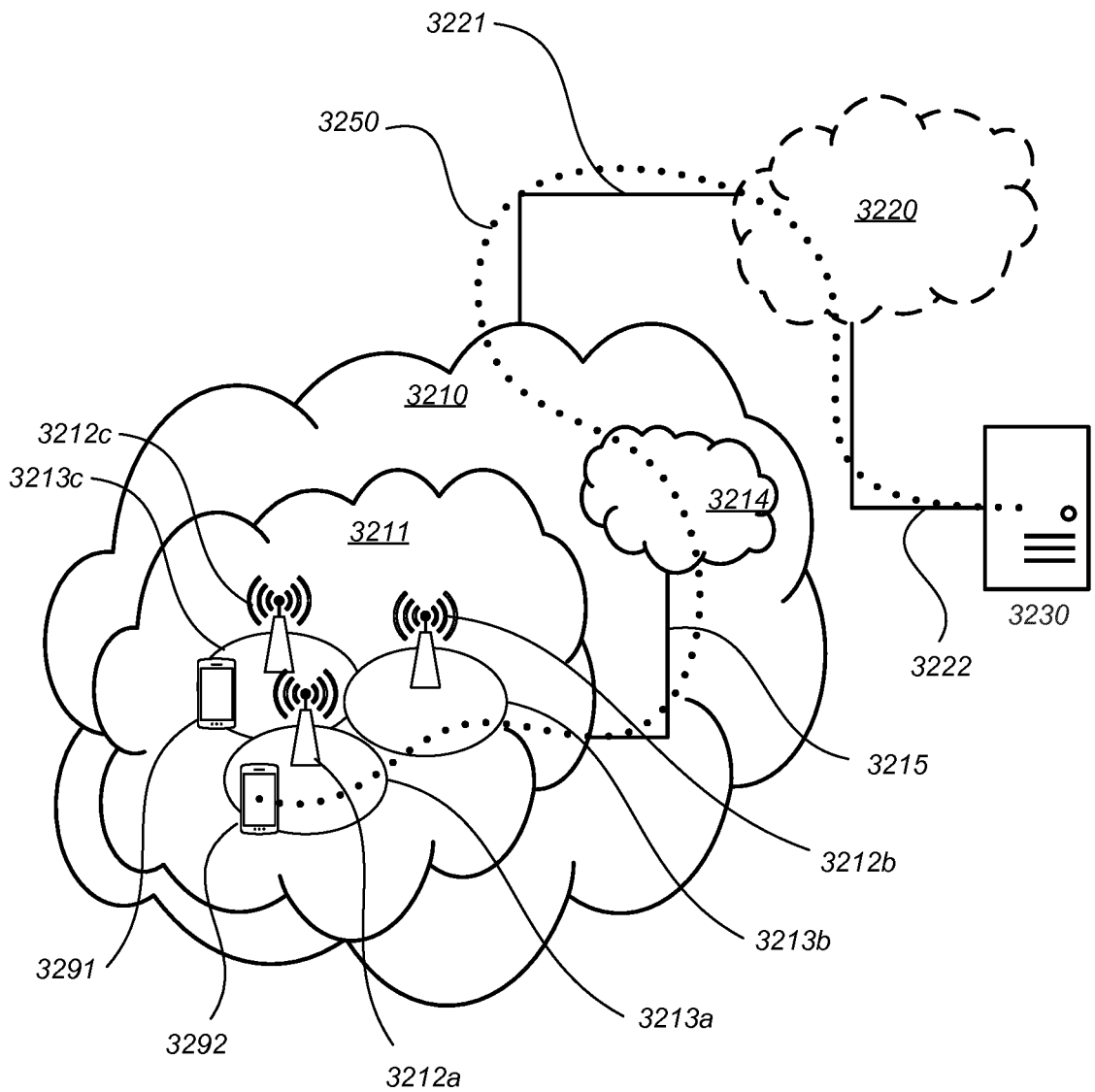
FIG. 5 schematically illustrates a telecommunication network connected via an intermediate network to a host computer.

With reference to FIG. 5, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 20, 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 10, 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 5 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 6. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 6) served by the base station 3320. The communication interface 3326 may be configured to facilitate a connection 3360 to the host computer 3310. The connection 3360 may be direct or it may pass through a core network (not shown in FIG. 6) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 6:
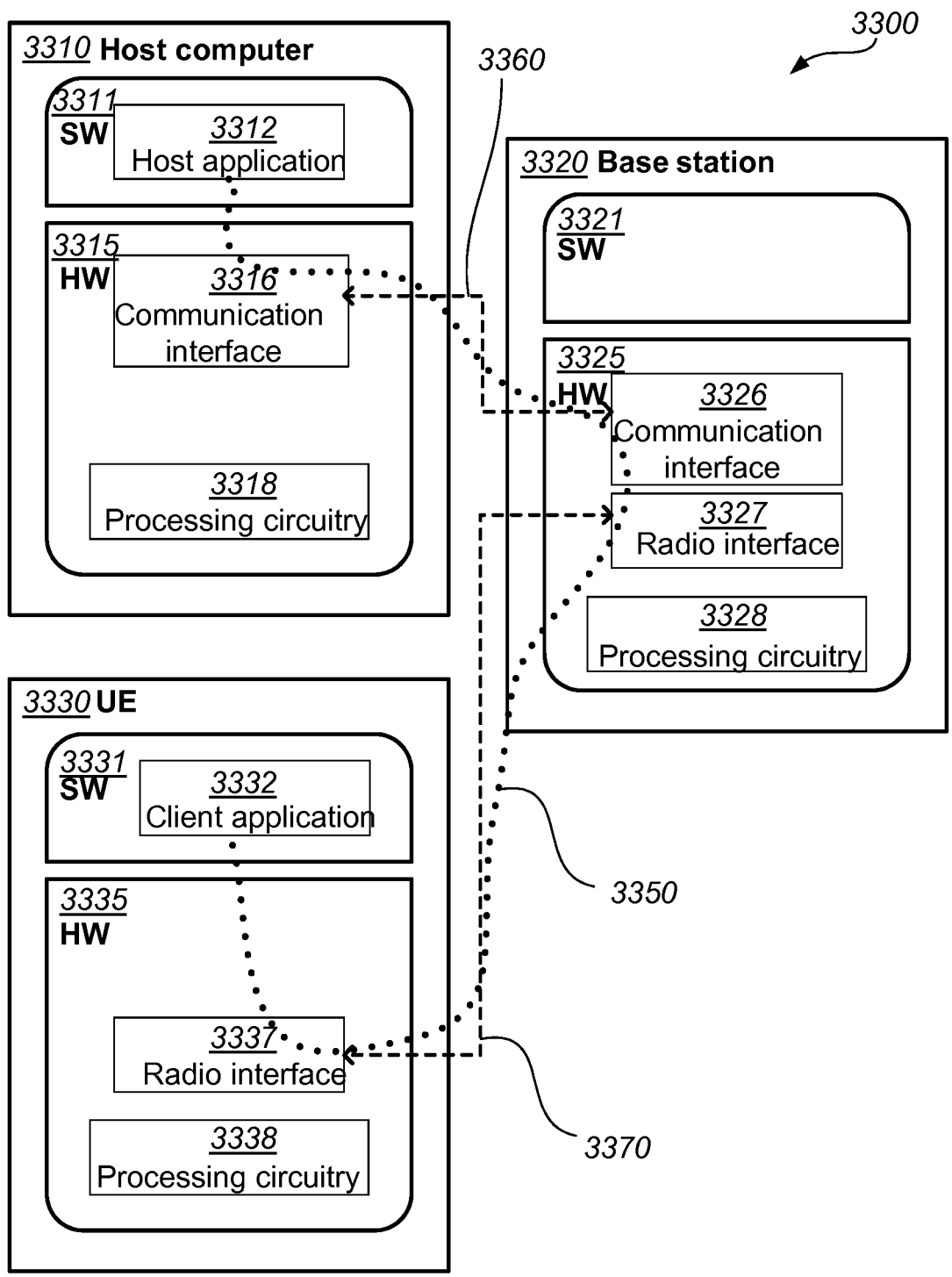
FIG. 6 is a generalized block diagram of a host computer communicating via a base station with a user equipment over a partially wireless connection.

It is noted that the host computer 3310, base station 3320 and UE 3330 illustrated in FIG. 6 may be identical to the host computer 3230, one of the base stations 3212a, 3212b, 3212c and one of the UEs 3291, 3292 of FIG. 5, respectively. This is to say, the inner workings of these entities may be as shown in FIG. 6 and independently, the surrounding network topology may be that of FIG. 5.

In FIG. 6, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the pSIM scheduling allowing more positioning assistance data to be broadcasted.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIGS. 7 and 8 and the corresponding text are about a downstream aspect of the radio-related invention, while FIGS. 9 and 10 and the corresponding text discuss an upstream aspect.

FIG. 7 is a flowchart illustrating a method implemented in a communication system, in accordance with one embodiment. The communication system includes a host computer, a base station such as a AP STA, and a UE such as a Non-AP STA which may be those described with reference to FIGS. 5 and 6. For simplicity of the present disclosure, only drawing references to FIG. 7 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 8 is a flowchart illustrating a method implemented in a communication system, in accordance with one embodiment. The communication system includes a host computer, a base station such as a AP STA, and a UE such as a Non-AP STA which may be those described with reference to FIGS. 5 and 6. For simplicity of the present disclosure, only drawing references to FIG. 8 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 5 and 6. For simplicity of the present disclosure, only drawing references to FIG. 9 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 5 and 6. For simplicity of the present disclosure, only drawing references to FIG. 10 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| GoB | Grid-of-Beams |
| HPBW | Half Power Beam Width |
| QCL | Quasi Co-Location |
| SSB | Synchronization Signal Beam |
| TCI | Transmission Configuration Indicator/Indication |
| TDD | Time Division Duplex |
| URLLC | Ultra-Reliable Low Latency Connection |

The invention claimed is:

1. A method performed by a radio network node for transmitting a Transmission Configuration Indication, TCI, update to a wireless device, the radio network node and the wireless device operating in a wireless communications network, the method comprising:

associating a first transmit beam with a first reference signal having one or more first Quasi Co-Location, QCL, channel properties, the first transmit beam giving the same one or more first QCL channel properties as the first reference signal and is used in data transmission to the wireless device;

determining one or more second QCL channel properties given by a second transmit beam when a beam change is triggered based at least in part on one or more of a midpoint between Half Power Beam Width limits, and a median or mean beam power gain pointing direction; and when the one or more second QCL channel properties is within a QCL channel property range of a second reference signal and when the second reference signal has one or more third QCL channel properties being different from the one or more first QCL channel properties, associating the second transmit beam with the second reference signal, and transmitting, to the wireless device, a TCI update comprising an indication of the second reference signal.

2. The method of claim 1, wherein the determining of the one or more second QCL channel properties comprises one or more of:

determining the one or more second QCL channel properties based on a finding of an angle spread $\sigma_{AS}$, wherein the angle spread $\sigma_{AS}$ is given by $$\sigma_{AS} = \sqrt{\frac{\sum_{n=1}^{N}\sum_{m=1}^{M}(\theta_{n,m,\mu})^2 \cdot P_{n,m}}{\sum_{n=1}^{N}\sum_{m=1}^{M} P_{n,m}}}$$

wherein N is a number of multipaths of a signal, M is a number of subpaths of the signal, $P_{n,m}$ is the power for the mth subpath of the nth path, wherein $\theta_{n,m,\mu}$ is defined as $\theta_{n,m,\mu} = \mathrm{mod}(\theta_{n,m} - \mu_\theta + \pi, 2\pi) - \pi$, and wherein $\mu_\theta$ is a reference angle given by $$\mu_\theta = \frac{\sum_{n=1}^{N}\sum_{m=1}^{M} \theta_{n,m} \cdot P_{n,m}}{\sum_{n=1}^{N}\sum_{m=1}^{M} P_{n,m}},$$

wherein $\Theta_{n,m}$ is a selected set of angles in a grid of angles with known antenna gains $P_{n,m}$.

3. The method of claim 2, wherein
at least one of at least one side lobe and at least one back lobe is excluded on the second transmit beam by restricting a range of included beam gain directions.

4. The method of claim 3, wherein the associating of the second transmit beam with the second reference signal comprises one or more of:
associating the second transmit beam with the second reference signal out of a set of second reference signals, wherein the second reference signal has a strongest beam gain in a determined second beam direction out of the set of second reference signals; and
associating the second transmit beam with the second reference signal out of a set of second reference signals, wherein the second reference signal is a reference signal out of the set of second reference signals that has a beam direction closest to a beam direction of the second transmit beam.

5. The method of claim 2, wherein the associating of the second transmit beam with the second reference signal comprises one or more of:
associating the second transmit beam with the second reference signal out of a set of second reference signals, wherein the second reference signal has a strongest beam gain in a determined second beam direction out of the set of second reference signals; and
associating the second transmit beam with the second reference signal out of a set of second reference signals, wherein the second reference signal is a reference signal out of the set of second reference signals that has a beam direction closest to a beam direction of the second transmit beam out of the set of second reference signals.

6. The method of claim 2, wherein the transmitting, to the wireless device, of the TCI update comprises:
transmitting the TCI update to the wireless device using one of the first transmit beam and the second transmit beam.

7. The method of claim 2, wherein the one or more QCL properties comprises one or more out of: a delay spread, a Doppler spread, a Doppler shift, an average gain, an average delay, and a spatial receive parameter.

8. The method of claim 2, further comprising:
receiving, from the wireless device, one or more Sounding Reference Signals, SRSs;
triggering a beam change based on the received one or more SRSs;
determining the second transmit beam based on the received one or more SRSs; and
transmitting data to the wireless device using the second transmit beam.

9. The method of claim 1, wherein the associating of the second transmit beam with the second reference signal comprises one or more of:
associating the second transmit beam with the second reference signal out of a set of second reference signals, wherein the second reference signal has a strongest beam gain in a determined second beam direction out of the set of second reference signals; and
associating the second transmit beam with the second reference signal out of a set of second reference signals, wherein the second reference signal is a reference signal out of the set of second reference signals that has a beam direction closest to a beam direction of the second transmit beam.

10. The method of claim 1, wherein the transmitting, to the wireless device, of the TCI update comprises:
transmitting the TCI update to the wireless device using one of the first transmit beam and the second transmit beam.

11. The method of claim 1, wherein the one or more QCL properties comprises one or more of: a delay spread, a Doppler spread, a Doppler shift, an average gain, an average delay, and a spatial receive parameter.

12. The method of claim 1, further comprising:
receiving, from the wireless device, one or more Sounding Reference Signals, SRSs;
triggering a beam change based on the received one or more SRSs;
determining the second transmit beam based on the received one or more SRSs; and
transmitting data to the wireless device using the second transmit beam.

13. A radio network node for transmitting a Transmission Configuration Indication, TCI, update to a wireless device, the radio network node and the wireless device being configured to operate in a wireless communications network, and the radio network node being configured to:
associate a first transmit beam with a first reference signal having one or more Quasi Co-Location, QCL, properties, the first transmit beam giving the same one or more first QCL properties as the first reference signal and is used in data transmission to the wireless device;
determine one or more second QCL channel properties given by a second transmit beam when a beam change is triggered based at least in part on one or more of a midpoint between Half Power Beam Width limits, and a median or mean beam power gain pointing direction; and
associate the second transmit beam with a second reference signal and transmit, to the wireless device, a TCI update comprising an indication of the second reference signal, when the one or more second QCL channel properties is within a QCL channel property range of the second reference signal and when the second reference signal has one or more third QCL channel properties being different from the one or more first QCL channel properties.

14. The radio network node of claim 13, wherein the radio network node is configured to determine the one or more second QCL properties by further being configured to perform one or more of:
 determining the one or more second QCL properties based on a finding of an angle spread $\sigma_{AS}$, wherein the angle spread $\sigma_{AS}$ is given by $$\sigma_{AS} = \sqrt{\frac{\sum_{n=1}^{N}\sum_{m=1}^{M}(\theta_{n,m,\mu})^2 \cdot P_{n,m}}{\sum_{n=1}^{N}\sum_{m=1}^{M}P_{n,m}}}$$

wherein N is a number of multipaths of a signal, M is a number of subpaths of the signal, $P_{n,m}$ is the power for the mth subpath of the nth path, wherein $\theta_{n,m,\mu}$ is defined as $\theta_{n,m,\mu} = \mathrm{mod}(\theta_{n,m}-\mu_\theta+\pi, 2\pi)-\pi,$ and wherein $\mu_\theta$ is a reference angle given by $$\mu_\theta = \frac{\sum_{n=1}^{N}\sum_{m=1}^{M}\theta_{n,m} \cdot P_{n,m}}{\sum_{n=1}^{N}\sum_{m=1}^{M}P_{n,m}},$$

wherein $\Theta_{n,m}$ is a selected set of angles in a grid of angles with known antenna gains $P_{n,m}$.

15. The radio network node of claim 14, wherein
 at least one of at least one side lobe and at least one back lobe is excluded on the second transmit beam by restricting a range of included beam gain directions.

16. The radio network node of claim 13, wherein the radio network node is configured to associate the second transmit beam with the second reference signal by further being configured to perform one or more out of:
 associating the second transmit beam with the second reference signal out of a set of second reference signals, wherein the second reference signal has a strongest beam gain in a determined second beam direction out of the set of second reference signals; and
 associating the second transmit beam with the second reference signal out of a set of second reference signals, wherein the second reference signal is a reference signal out of the set of second reference signals that has a beam direction closest to a beam direction of the second transmit beam.

17. The radio network node of claim 13, wherein the radio network node is configured to transmit the TCI update to the wireless device by further being configured to:
 transmit the TCI update to the wireless device using the first transmit beam or the second transmit beam.

18. The radio network node of claim 13, wherein the one or more QCL properties comprises one or more out of: a delay spread, a Doppler spread, a Doppler shift, an average gain, an average delay, and a spatial receive parameter.

19. The radio network node of claim 13, further being configured to:
 receive, from the wireless device, one or more Sounding Reference Signals, SRSs;
 trigger a beam change based on the received one or more SRSs;
 determine the second transmit beam based on the received one or more SRSs; and
 transmit data to the wireless device using the second transmit beam.

20. A non-transitory computer storage medium storing a computer program, comprising instructions which, when executed on at least one processor, causes the at least one processor to perform a method, the method comprising:
 associating a first transmit beam with a first reference signal having one or more first Quasi Co-Location, QCL, channel properties, the first transmit beam giving the same one or more first QCL channel properties as the first reference signal and is used in data transmission to a wireless device;
 determining one or more second QCL channel properties given by a second transmit beam when a beam change is triggered based at least in part on one or more of a midpoint between Half Power Beam Width limits and a median or mean beam power gain pointing direction; and
 when the one or more second QCL channel properties is within a QCL channel property range of a second reference signal and when the second reference signal has one or more third QCL channel properties being different from the one or more first QCL channel properties, associating the second transmit beam with the second reference signal, and transmitting, to the wireless device, a TCI update comprising an indication of the second reference signal.

\* \* \* \* \*